Sept. 23, 1969  W. G. PLATT ET AL  3,468,550
CHUCK

Filed May 23, 1966  2 Sheets-Sheet 1

INVENTORS
WILLIAM G. PLATT
ROY T. JACKS
BY *Whittemore,*
*Hulbert & Belknap*
ATTORNEYS Sept. 23, 1969   W. G. PLATT ET AL   3,468,550
CHUCK Filed May 23, 1966   2 Sheets-Sheet 2

INVENTORS
WILLIAM G. PLATT
ROY T. JACKS
BY *Whittemore,*
*Hulbert & Belknap*
ATTORNEYS

United States Patent Office 3,468,550
Patented Sept. 23, 1969

3,468,550
CHUCK
William G. Platt, 3930 Harvard Road, Detroit, Mich. 48224, and Roy T. Jacks, 30607 Lorraine Ave., Warren, Mich. 48093
Filed May 23, 1966, Ser. No. 552,040
Int. Cl. B23b 31/40, 31/14, 5/34
U.S. Cl. 279—2         11 Claims

ABSTRACT OF THE DISCLOSURE

Chuck structure for lathes or the like capable of internal or external chucking either manually or automatically. The chuck structure disclosed has a pulldown feature in both internal and external chucking and is adapted to receive bar work in one modification thereof. Internal and external chucking is accomplished by providing separate spaced apart jaw structures which are rotatable about separate axes parallel to and spaced radially from the axis of rotation of the chuck. An inclined slide is provided in each jaw structure actuated by bell crank means secured to the jaw structure for providing the pulldown feature. The bell cranks of the jaw structures are actuated by separate rods in accordance with rotation of an internally threaded ring gear engaged with external threads on the rods in one modification and in accordance with a pull rod connected to an actuating member having portions engaged in recesses in the actuating rods in another modification.

---

In the past it has been necessary to stock several different chucks and to change the entire chuck when changing types of jobs requiring, for example, internal and external chucking, pull-down features and the like. Where chucks capable of both internal and external chucking have in the past been provided, they have not provided a pull-down feature on both the internal and external chucking and have often not been constructed to be either manually or automatically actuated by a force in a single direction or adapted to receive bar stock. All of these features have not previously been available in a single chuck.

It is therefore one of the objects of the present invention to provide improved chuck structure.

Another object is to provide chuck structure for a lathe or the like capable of either internal or external chucking.

Another object is to provide chuck structure as set forth above and including a work pull-down feature in conjunction with both internal and external chucking.

Another object is to provide chuck structure as set forth above which may be either manually or automatically operated.

Another object is to provide chuck structure as set forth above adapted to receive bar work.

Another object is to provide chuck structure as set forth above wherein either internal or external chucking may be accomplished by a force in a single direction.

Another object is to provide chuck structure as set forth above including unique pinion drive structure.

Another object is to provide unique pinion drive structure for a lathe chuck or the like.

Another object is to provide chuck structure which is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be disclosed in detail.

Figure 1:
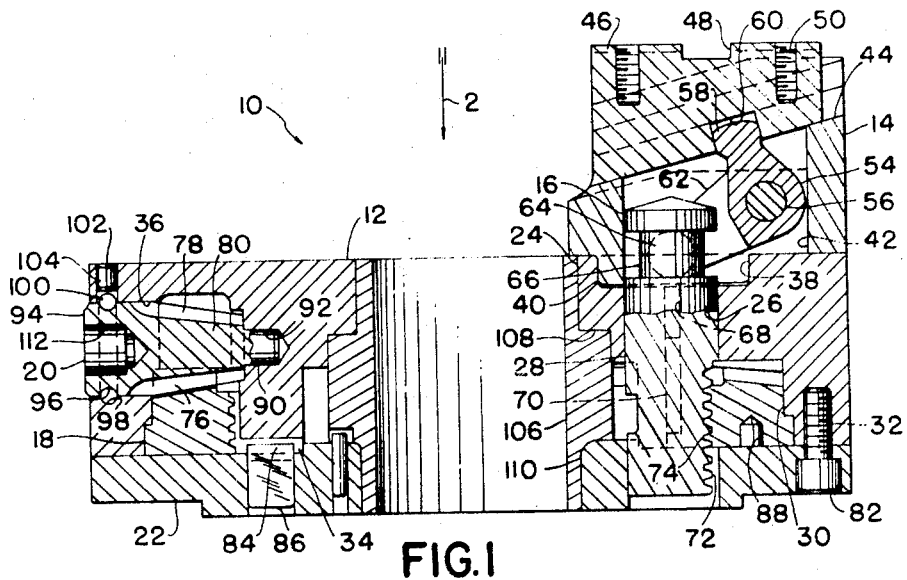
FIGURE 1 is a section view of chuck structure constructed in accordance with the invention and taken substantially on the line 1—1 in FIGURE 2.

As shown best in FIGURE 1, the chuck structure 10 includes a body member 12 supporting a plurality of jaw structures 14. Jaw structures 14 are actuated by the actuating mechanisms 16 which are driven by the driving ring 18 through the pinion structure 20 for either internal or external chucking of work. A back-plate 22 is provided to secure the driving ring 18 to the body member 12.

In operation the jaw structures 14 are positioned as desired to perform a required chucking operation, such as internal or external chucking, and the pinion mechanism 20 is rotated to rotate the driving ring 18 which will in turn drive the actuating mechanisms 16 in a proper direction to perform the desired chucking operation.

More specifically the body member 12 of the chuck structure 10 is a metal disc having a stepped central opening 24 extending therethrough. The body member 12 also includes three angularly spaced smaller openings 26 extending therethrough through which the posts 28 of the actuating mechanisms 16 extend. An annular recess 30 is also provided in the body member 12 to receive the driving ring 18 radially outwardly of the body member 12 from the posts 28 and in engagement therewith as will be considered further subsequently.

Tapped openings 32 are provided around the periphery of the body member 12 so that the back-plate 22 may be secured thereto as desired, and an aligning recess 34 is provided as shown. Also, a radially extending bore 36 is provided in the body member 12 to receive the pinion structure 20 and circular recesses 38 are provided in the front surface of the body member 12 to receive the circular mounting portions 40 of the jaw structures 14.

Figure 2:
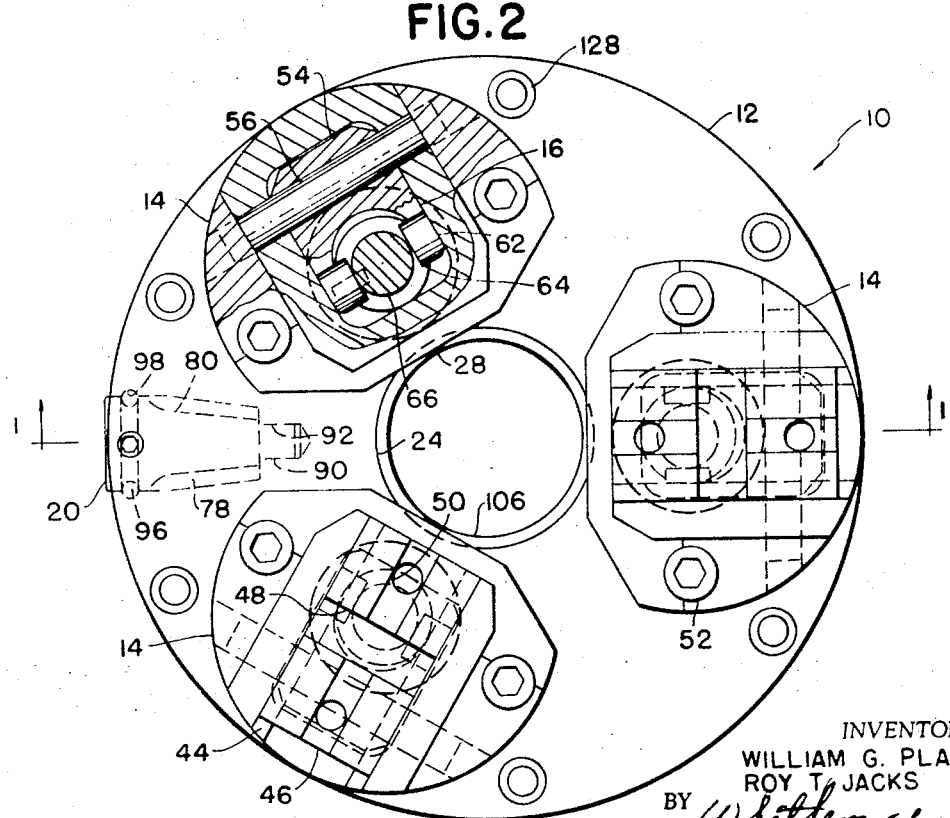
FIGURE 2 is a front view of the chuck structure illustrated in FIGURE 1 taken in the direction of arrow 2 in FIGURE 1.
Figure 3:
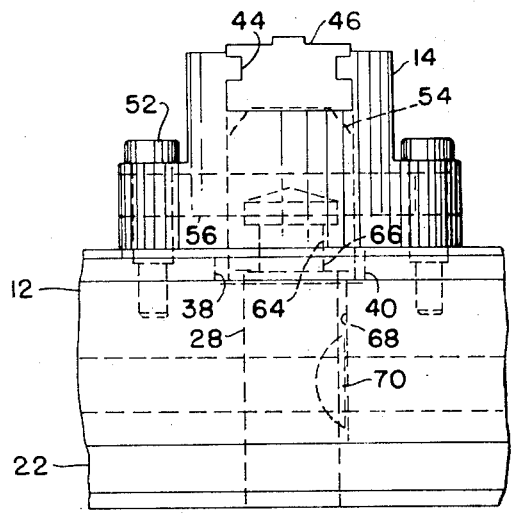
FIGURE 3 is a partial elevation view of the chuck structure illustrated in FIGURE 1 taken in the direction of arrow 3 in FIGURE 1.

Each of the jaw structures 14, three of which are provided, are equally spaced angularly about the center of the body member 12, as shown best in FIGURE 2. Each jaw structure 14 includes a body portion having an inner recess 42 in which a portion of an actuating mechanism 16 is pivotally mounted and has an inclined inverted T-shaped guide slot 44 in the outer surface thereof. A gripping jaw supporting slide 46 is mounted in the guide slot 44 for movement radially of the body member 12. The slide 46 has the transverse recess 48 and threaded openings 50 in the front surface thereof to which the usual gripping jaw may be secured.

As shown in FIGURE 2 the separate jaw structures 14 may be positioned in two positions rotated one hundred eighty degrees from each other by removing the bolts 52 securing the jaw structures to the body member 12 and rotating the jaw structures 14 through an angle of one hundred eighty degrees with the circular mounting portion 40 of the chuck structures in the recesses 38. The bolts 52 are then repositioned. Such movement of the individual jaw structures 14 permits both internal and external chucking with the chuck 10 with a pull-down feature regardless of the direction of chucking.

Figure 5:
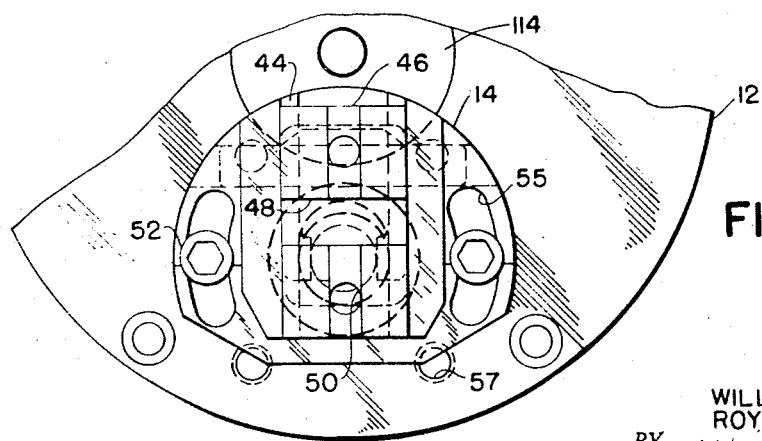
FIGURE 5 is a partial front view of another modification of the chuck structure illustrated in FIGURE 1.

With the modified chuck structure illustrated in FIGURE 5 the jaw structures may be moved angularly through substantially any desired angle of rotation with respect to a workpiece for chucking purposes due to the arcuate slots 55 provided in the body member of the jaw structures and the additional angularly spaced apart threaded openings 57 in the base 12 for bolts 52.

The actuating mechanisms 16 include a bell-crank 54 pivotally mounted within the body member 12 of the jaw structures 14 by a pivot pin 56. As shown the end 58 of the bell-crank 56 is adapted to fit within the recess 60 of the slide 46 so that as the bell-crank 54 is pivoted about the pivot pin 56, the slide 46 is moved radially of the body member 12 of the chuck 10 and at an angle to the axis of the body member 12.

The other end 62 of the bell-crank 54 is bifurcated, as shown best in FIGURE 2, and includes the separate abutments 64 extending inwardly toward each other from the separate portions of the bifurcated end 62 of the bell-crank 54. The abutments 64 fit within the annular external recess 66 of the post 28 with which they are associated.

The post 28, provided in conjunction with each actuating mechanism 14, as shown, extends through an opening 26 in the body member 12. A slot 68 and key 70 are provided between the post 28 and body member 12 to insure only axial movement of the post 28 relative to the body member 12. The radially outer edge of the post 28, as shown in FIGURE 1, is provided with threads 72 whereby the post 28 is moved axially on rotation of the driving ring 18 to pivot the bifurcated bell-crank 54.

The driving ring 18, as shown best in FIGURE 1, is provided with the axially extending threads 74 internally. The threads 74 are in engagement with the threads 72 of the post 28. Ring 18 is further provided with gear teeth 76 on one surface thereof, as shown in FIGURE 1, which are in mesh with the teeth 78 of the pinion 80 of pinion structure 20. Thus, on rotation of the pinion 80, the driving ring 18 will rotate to move the posts 28 axially.

Ring 18 is held within body member 12 by means of the back-plate 22 connected to the body member 12 by convenient means, such as the bolts 82. The back-plate 22 is accurately positioned relative to the body member 12 by means of the slot 34 and the flat sides 84 on the positioning plug 86 carried by the back-plate 22. Recesses 88 are provided at angularly spaced apart locations around the drive ring 18 so that the drive ring 18 may be removed easily by means of a spanner wrench or the like when the back-plate 22 is removed.

The drive structure 20 includes the pinion 80 having the bearing 90 on the inner end thereof within the bearing recess 92 of the body member 12. The other end 94 of the pinion 80 is provided with a half-circular, annular groove 96 therearound complementary with a half-circular, annular groove 98 in the body member 12 whereby bearings 100 are retained to support the end 94 of the pinion 80 in rotation. The bearings 100 are put in place with the pinion fully inserted in the recess 36 through the opening 102 in body member 12 which is subsequently plugged by the removable threaded plug 104.

As shown in FIGURE 1, an insert 106 is secured centrally of the body member 12 between the annular abutment 108 on the body member 12 and the surface 110 of the back-plate 22. Bar stock may be fed through the internal diameter of the insert 106 and chucked by the jaw structures 14, if desired.

Thus, in overall operation of the chuck structure 10, it is first decided what type of chuck is desired for a particular workpiece, that is internal or external chuck, so that the jaw structures 14 are properly positioned to provide the desired chucking with a pull-down feature due to the inclined nature of the slot 44 and the jaw structures 14 are secured in place. The workpiece, for example a pipe to be internally chucked, is positioned through the insert 106 and the pinion 80 is rotated by convenient manual means, such as a hand-crank in recess 112 of the pinion structure 20 or the drive shaft of a motor therein or the like.

Rotation of the pinion 80 will produce rotation of the ring 18, consequent axial movement of the posts 28, and pivotal movement of the bell-cranks 54 about the pivot pins 42. The slides 46 will thus be moved to provide the desired chucking in conjunction with jaws (not shown) secured thereto. The work may be released by rotating the pinion 80 in the opposite direction from the direction of rotation on chucking.

Figure 4:
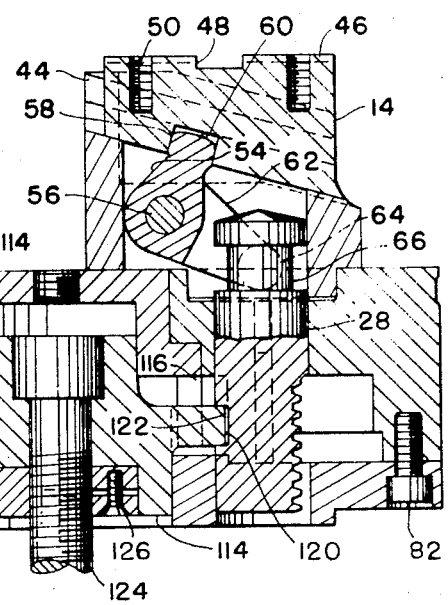
FIGURE 4 is a section view of modified chuck structure similar to that of FIGURE 1.

In the modified chuck structure illustrated in FIGURE 4, the insert 106 has been replaced by a stepped insert 114 having angularly spaced slots 116 through the side thereof adjacent the post 28. An actuating member 118 having fingers 120 extending radially outwardly therefrom through the slot 116 and into the recesses 122 in posts 28 is positioned in the insert 114. A draw-bar 124 is secured to the actuating member 118 by convenient locking structure 126.

Thus, on axial movement of the draw-bar 124, the posts 28 are again caused to move axially to move the slides 46 of jaw structures 14 into or out of a chucking relation to a workpiece. The actuating ring 18 must be removed in the modified structure of FIGURE 4 to permit movement of posts 28 by draw-bar 124, as will be obvious on viewing FIGURE 4.

With both the chuck structure 10 and the modified chuck structure of FIGURE 4 it will be noted that both internal and external chucking may be accomplished by movement of the driving ring or draw-bar in one direction on selected positioning of the body member 46 of the jaw structures 14.

Thus, it will be seen that in accordance with the invention, there is provided a single chuck which will replace four or five present chucks necessary to provide proper chucking of a range of work, including internal and external chucks having pull-down features of both the manual and automatic actuation variety which may be operated for both internal or external chucking by a single direction actuating force. Further, it will be noted that the chuck structure of the invention is particularly simple in relation to the versatility thereof and is of relatively small axial dimension.

While one embodiment of the present invention and modifications thereof have been disclosed in detail, it will be understood that other embodiments and modifications are contemplated. For example, the chuck structure of the invention need not be used on a spindle in the usual manner but may be on a fixed base to which it may be secured by means of the bolts 128 which may also be used to secure the chuck to a spindle (not shown). Further any number of jaw structures 14 may be used depending on the type of chucking desired. It is the intention to include all embodiments and modifications as are defined by the appended claims within the scope of the invention.

What we claim as our invention is:

1. Chuck structure comprising a base having one axis of rotation, jaw structures each having a separate axis of rotation extending therethrough positioned on the base for chucking work in different directions, each of the jaw structures including a guide and a slide positioned in the guide for movement radially inwardly and outwardly of the base, actuating mechanisms for the jaw structures operably associated with the jaw structures each including a recess in the slide, a bell crank pivoted to the guide one end of which is positioned within the recess in the slide, a rod extending parallel to the axis of rotation of the base having an annular recess about one end thereof, the other end of said bell crank being bifurcated and including abutments extending toward each other positioned within the annular recesses on the rod whereby axial movement of the rod will produce pivotal movement of the bell crank and radial movement of the slide and drive structure for the actuating mechanisms positioned between the base and actuating mechanisms comprising a threaded portion on the radial outer surface of the rods with respect to the axis of the base and a driving ring secured in the base internally threaded and in mesh with the threaded portions of the rod, gear teeth on said driving ring, pinion means in engagement with the gear teeth and means for rotating the pinion means.

2. Chuck structure comprising a base having one axis of rotation, jaw structures each having a separate axis of rotation extending therethrough positioned on the base for chucking work in different directions, each of the jaw structures including a guide and a slide positioned in the guide for movement radially inwardly and outwardly of the base, actuating mechanisms for the jaw structures operably associated with the jaw structures each including a recess in the slide, a bell crank pivoted to the guide, one end of which is positioned within the recess in the slide, a rod extending parallel to the axis of rotation of the base having an annular recess about one end thereof, the other end of said bell crank being bifurcated and including abutments extending toward each other positioned within the annular recesses on the rod whereby axial movement of the rod will produce pivotal movement of the bell crank and radial movement of the slide and drive structure for the actuating mechanisms positioned between the base and actuating mechanisms comprising a recess in the radial inner surface of the rods, an insert positioned in the base for axial movement relative to the base having finger portions inserted in the recess in the rods and means secured to the insert for moving the insert axially relative to the base whereby the rods are moved axially of the base with the insert to pivot the bell cranks and move the slides radially of the base.

3. Chuck structure comprising a base having an axis of rotation, radially outwardly located angularly spaced apart jaw structures positioned on the base each having a separate axis of rotation parallel to the axis of rotation of the base, means for securing the jaw structures to the base for rotation about the separate axis thereof, each of the jaw structures including a guide and a slide movable on the guide and actuating mechanism operably associated with the jaw structure and base for moving the slide along the guide of the jaw structures radially of the base and toward the base during chucking whereby internal or external chucking with a pulldown feature may be accomplished.

4. Structure as set forth in claim 3, wherein the actuating mechanism includes separate bell cranks pivoted to the jaw structures, one end of which engage the slides and separate actuating rods associated with each of the jaw structures and engaged with the other ends of the bell cranks.

5. Structure as set forth in claim 3, wherein the means for securing the jaw structures to the base permit rotation of the jaw structures into positions separated by 180°.

6. Structure as set forth in claim 3, wherein the means for securing the jaw structures to the base permit rotation of the jaw structures into positions wherein the direction of movement of the slides is inclined with respect to the radii of the base.

7. Structure as set forth in claim 3, wherein the guide is inclined with respect to the axis of the base to provide the movement of the slide toward the base during chucking.

8. Structure as set forth in claim 4 and further including drive structure comprising a threaded radial outer surface on the rods, an internally threaded ring in mesh with the threaded surface of the rods and means for rotating the ring in a stationary position with respect to the base whereby the rods are moved axially of the base.

9. Structure as set forth in claim 4 and further including drive structure comprising a recess in the rods opening toward the axis of the base, an actuating member extending axially of the base including finger portions extending radially outwardly therefrom and into the recess in the rods and a draw bar secured to the actuating member.

10. Structure as set forth in claim 3 and further including an axially extending central opening in the base whereby the chuck structure is adapted to receive bar stock or the like extending through the chuck structure.

11. Structure as set forth in claim 1 wherein the pinion means includes a radial recess in the base, a pinion inserted within said recess having a cylindrical bearing surface on the inner end thereof, pinion teeth centrally thereof and an annular groove around the outer end thereof having a half-circular cross section, an annular groove around the outer edge of the recess in the base having a half-circular cross section forming a ring of circular cross section with the annular groove in the pinion member, an axial opening in the base communicating with the circular ring through which ball-bearings may be introduced into the circular ring with the pinion member positioned in the base, ball-bearings in the circular ring and a plug in the axial opening for retaining the bearings in the base.

References Cited
UNITED STATES PATENTS

| | | | |
|---|---|---|---|
| 1,392,678 | 10/1921 | Buhr | 279—119 |
| 2,867,443 | 1/1959 | Swanson | 279—119 |
| 2,950,117 | 8/1960 | Walmsley | 279—123 |
| 2,974,969 | 3/1961 | Manchester | 279—123 |
| 2,993,701 | 7/1961 | Arnold | 279—119 X |
| 3,097,860 | 7/1963 | Feldhoff | 279—117 X |

ROBERT C. RIORDAN, Primary Examiner

D. R. MELTON, Assistant Examiner

U.S. Cl. X.R.

279—119